United States Patent [19]

Herman et al.

[11] Patent Number: 4,539,682

[45] Date of Patent: Sep. 3, 1985

[54] METHOD AND APPARATUS FOR SIGNALING ON-LINE FAILURE DETECTION

[75] Inventors: Jan S. Herman, Holliston; Peter A. Morrison; Gerald P. Richards, both of Framingham, all of Mass.

[73] Assignee: The United States of America as represented by the Secretary of the Army, Washington, D.C.

[21] Appl. No.: 484,107

[22] Filed: Apr. 11, 1983

[51] Int. Cl.³ .............................................. G06F 11/00
[52] U.S. Cl. ......................................... 371/15; 371/29
[58] Field of Search .................... 371/29, 15, 16, 18, 371/11; 364/200, 900

[56] References Cited

U.S. PATENT DOCUMENTS

| | | | |
|---|---|---|---|
| 3,876,987 | 4/1975 | Dalton et al. | 364/200 |
| 4,041,455 | 8/1977 | Norberg | 371/15 |
| 4,100,605 | 7/1978 | Holman | 364/900 |
| 4,167,041 | 9/1979 | Curlander et al. | 364/900 |
| 4,181,940 | 1/1980 | Underwood et al. | 364/200 |
| 4,241,330 | 12/1980 | Hery et al. | 364/200 |
| 4,321,666 | 3/1982 | Tasar et al. | 364/200 |
| 4,322,791 | 3/1982 | Ishii | 371/29 |
| 4,323,966 | 4/1982 | Whiteside et al. | 364/200 |
| 4,371,952 | 2/1983 | Schuck | 364/900 |
| 4,438,494 | 3/1984 | Budde et al. | 364/200 |

Primary Examiner—Michael R. Fleming
Attorney, Agent, or Firm—Anthony T. Lane; Jeremiah G. Murray; Robert A. Maikis

[57] ABSTRACT

Method and apparatus permitting a multi-module digital system, such as a computer, having built-in test hardware associated with each module, including a plurality of signal processing units to communicate over two wire circuitry not only the existence of a failure of a particular module, but also its causality. This is accomplished by means of a four state signaling circuit interposed between each signal processing unit of a particular module and a module built-in test circuit which operates once an error output is reported by a signal processing unit to provide a further four state indication of the details of the failure.

19 Claims, 2 Drawing Figures

METHOD AND APPARATUS FOR SIGNALING ON-LINE FAILURE DETECTION

The Government has rights to this invention pursuant to Contract No. DAAK80-81-C-0053 awarded by the Department of the Army.

FIELD OF THE INVENTION

This invention relates generally to test equipment for electrical apparatus and more particularly to built-in test equipment for multi-module digital systems.

BACKGROUND OF THE INVENTION

On-line built-in test (BIT) equipment is generally known; however, such apparatus is now becoming a vital part of digital systems, such as computers, which are comprised of many interconnected modules, each containing a plurality of large scale integration semiconductor chips which operate, for example, as individual signal processing units. Due to the chip complexity, reliability and pinout capability present in currently utilized large scale integrated (LSI) chips, many different types of constraints are imposed on system design and any built-in test hardware must maintain a very low profile from an overall system viewpoint. By this is meant maximum failure information must be extracted at a minimum cost in hardware and connectivity.

Accordingly, current built-in test equipment for digital systems is normally limited to the detection of occurrences and the conveyance of an error alarm to a system level control. To avoid added hardware and/or signal paths, little or no detailed information is normally conveyed from the site of the observed failure to higher system levels and separate software and/or hardware is relied upon to identify the error source.

SUMMARY OF THE INVENTION

Accordingly, it is an object of the invention to provide an improvement in built-in test equipment for digital systems.

It is another object of the invention to provide built-in test equipment for digital systems which is adapted not only to digitally detect the locality of error occurrences, but also the causality thereof.

It is a further object of the invention to perform fault isolation at the module level of a modular type digital signal processing system.

It is still a further object of the invention to provide built-in test equipment having the capability of additionally providing information about the type of failure which has occurred at a particular location.

These and other objects are achieved in accordance with the method and apparatus for providing, on a two wire built-in test digital signaling path, following the binary indication of a failure thereon, binary signals corresponding to a four state indication of failure detail of each of a plurality of digital signal processing units, which may be, for example, large scale integrated semiconductor chips, which are included within a single module of a multi-module system. The four state indicating signals for each processing unit are applied via respective two wire signaling paths to built-in test circuitry associated with each module which is operable to apply a priority type output to higher level built-in test apparatus which can then signal the location of the faulty module and/or take appropriate action to remove the module electrically from the system.

DESCRIPTION OF THE PREFERRED EMBODIMENT

Figure 1:
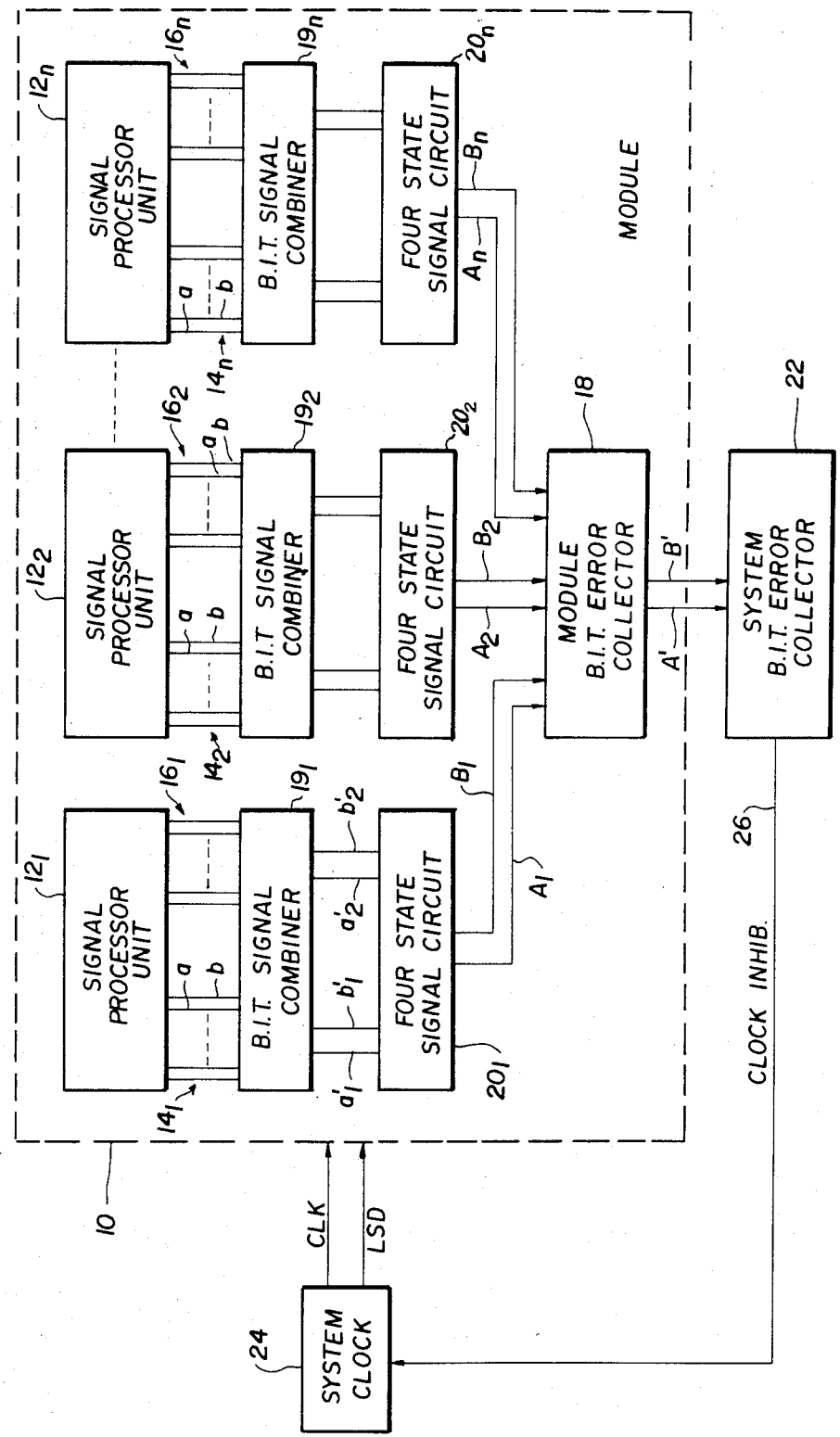
FIG. 1 is an electrical block diagram of a typical module in a multi-module digital system including built-in test apparatus in accordance with the subject invention.

Referring now to the drawings and more particularly to FIG. 1, reference numeral 10 is intended to designate one of a plurality of modules of a multi-module digital system, such as a digital computer, wherein each module is comprised of a plurality of digital signal processing units (SPU) $12_1$, $12_2$ ... $12_n$ which are implemented in respective large scale integration (LSI) semiconductor chips of well known design. Each processing unit $12_1$, $12_2$ ... $12_n$ includes a first set of two wire output signal paths $14_1$, $14_2$ ... $14_n$ which are adapted to report internal failures and output signal faults occurring within the respective SPU and a second set of two wire output signal paths $16_1$, $16_2$ ... $16_n$ for reporting input signal related errors before they are processed by the internal circuit configurations of the particular SPU. Each of the two wire signaling paths $14_i$ and $16_i$, moreover, is comprised of two circuit leads or wires a and b. Each module 10, moreover, includes its own built-in test (BIT) error collection circuitry 18 in addition to the built-in test error detection circuitry located within each signal processing unit $12_1$ ... $12_n$. The module BIT circuitry 18 receives signals of built-in test status from the SPU's by way of respective BIT signal combiners $19_1$, $19_2$ ... $19_n$ and four state signaling circuits $20_1$, $20_2$ ... $20_n$, the latter being coupled to the error collector chip 18 by means of respective two wire signaling paths $A_1$, $B_1$ ... $A_n$, $B_n$. For the purpose of minimizing chip pinouts required, the bit signal combiner $19_i$ and the respective four state signal circuit $20_i$ are preferably incorporated with the ith SPU $12_i$ within a common LSI chip.

The built-in test error collection circuitry 18 within the module 10 is coupled to a system level built-in test error collector 22 by means of a two wire signaling path comprised of the leads or wires A' and B'. The system level bit collector 22 is adapted to receive like two wire signaling paths A', B' from other like modules, not shown, in the system and performs the system level function of stopping further signal processing upon detection of a fault at the SPU level by a process such as stopping a system clock 24 which is coupled to the various modules, for example, module 10 shown in FIG. 1. This is shown for purposes of illustration by a circuit lead 26 connected between the system level built-in test collector 22 to the system clock 24 and is intended to carry, for example, a clock inhibit signal thereon. In reality, the clock 24 may comprise a system of synchronized clocks.

In prior art built-in test equipment associated with digital systems, while the BIT signal combiners $19_1$, $19_2$ ... $19_n$ were known to be used, the four state signal circuits $20_1$, $20_2$ and $20_n$ were lacking and signaling of built-in test status of the SPU's was conveyed from the signal processing units $12_1$, $12_2$ ... $12_n$ to the signal processing unit error collector 18 either directly by means of the two sets of two wire signaling paths $14_1$ .

... $14_n$ and $16_1 \ldots 16_n$ or by way of the BIT signal combiners $19_1, 19_2 \ldots 19_n$ via, for example, a respective pair of two wire signaling paths $a_1', b_1'$ and $a_2', b_2'$ which conveyed combined internal failures and combined input signal failures, respectively. In operation a failure (error) or no-failure (no error) of BIT status was reported in terms of the binary digital state of the signal on each signal path pair a and b out of the particular SPU. Typically, if mutually different binary values appeared on wires a and b, (wire a=0, wire b=1 or wire a=1, wire b=0) a "no error" status was meant to be indicated, while the mutually same binary value on both wires (wire a=0, wire b=0 or wire a=1, wire b=1) was meant to be indicative of an "error" status. This type of operation, however, fails to provide any significant information as to the cause of the "error" except possibly for a system's built-in test indication of which module or modules, as the case may be, reported the error. Because error sources often cause apparent errors in destinations rather than or in addition to the true source, simple knowledge of which module(s) reported an error is usually of little use in fault location. It is to this aspect that the present invention is directed.

Figure 2:
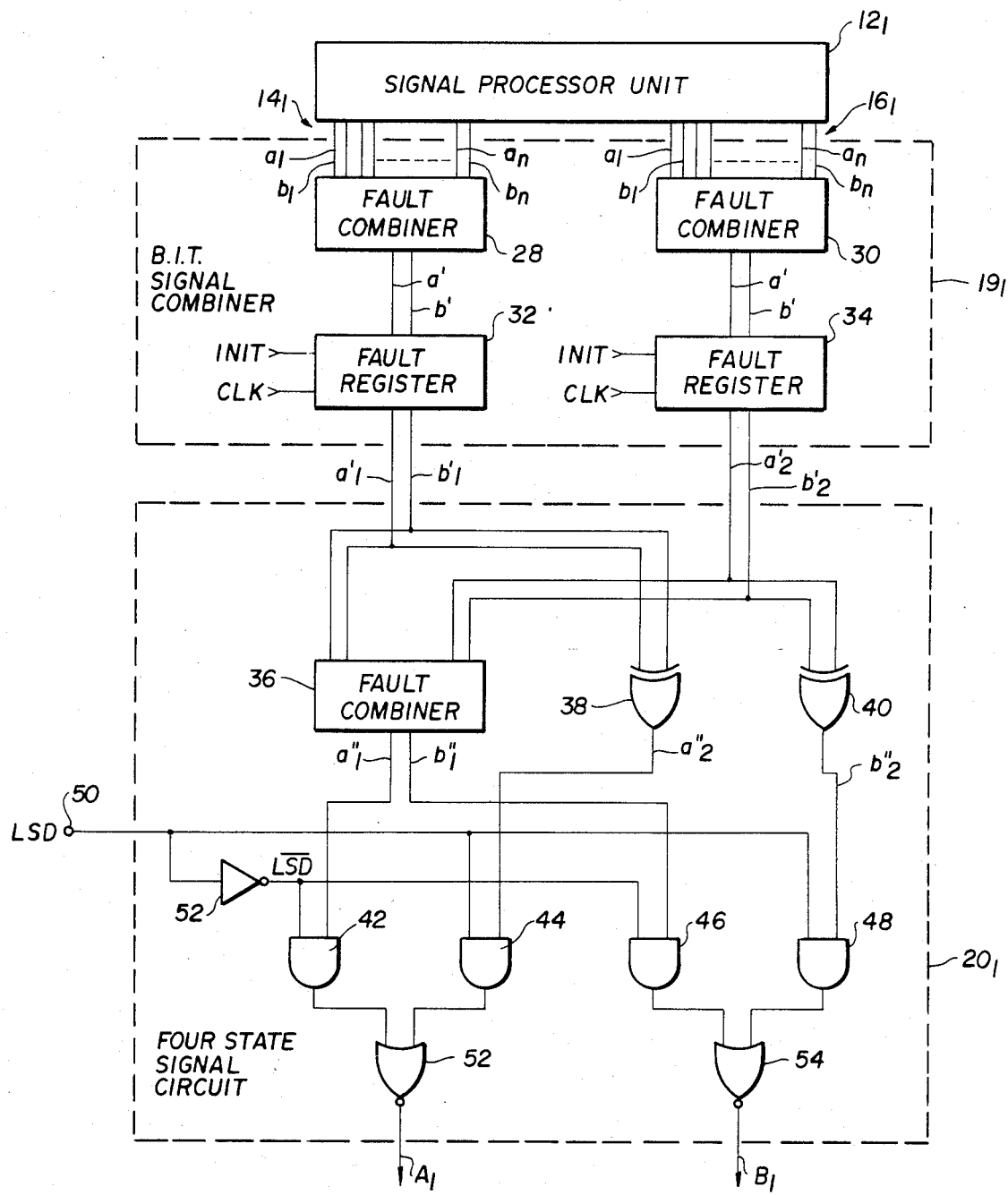
FIG. 2 is an electrical block diagram illustrative of the preferred embodiment of means for carrying out the subject invention at the module level.

Referring now to FIG. 2, shown in detail is one of the BIT signal combiners $19_1$ coupled to signal processing unit $12_1$, and which feeds into a four state signaling circuit $20_1$ included in the module 10.

As noted above, for the purpose of minimizing LSI pinout requirements, bit signal combiner $19_1$ and signaling circuit $20_1$ are preferably co-resident within the LSI chip containing the SPU $12_1$. It is understood that the other BIT signal combiners $19_2 \ldots 19_n$ and signaling circuits $20_2 \ldots 20_n$ in module 10 are identical in configuration and are respectively coupled to their respective signal processing units $12_2 \ldots 12_n$.

The BIT signal combiner $19_1$ is comprised of a first and second fault combiner 28 and 30 which are respectively coupled to the multiple pairs of two wire signaling paths, $a_1, b_1 \ldots a_n, b_n$ of the two sets of signaling paths $14_1$ and $16_1$ out of the signal processing unit $12_1$. The fault combiners 28 and 30 comprise combinational logic which produce an error output indication whenever one or more of the respective input signals indicate an error.

The respective two wire output leads a' and b' of combiners 28 and 30 are respectively fed into a fault register 32 and 34. These registers function as holding registers and are required for retiming fault indications and freezing the fault status existing at report time (via the stoppage of clocks). The start (INIT) and clock (CLK) input terminals of register 32 and 34 receive a "start" signal and a "clock" signal from a system clock 24, for example, shown in FIG. 1. The fault register 32 includes two wire output signal leads $a'_1$ and $b'_1$ which provide fault status indication to another fault combiner 36 as well as a first EXCLUSIVE OR circuit 38 which forms part of the four state signal circuit 20. The fault register 34 in a like manner has a two wire output comprised of circuit leads $a'_2$ and $b'_2$ which are commonly coupled to the fault combiner 36 and a second EXCLUSIVE OR circuit 40 in the four state signal circuit $20_1$.

The fault combiner 36 in circuit $20_1$ provides two output signals on circuit leads $a''_1$ and $b''_1$ while the EXCLUSIVE OR circuits 38 and 40 provide single outputs on respective output circuit lead $a''_2$ and $b''_2$. These four output lines $a''_1, b''_1, a''_2$ and $b''_2$ connect to four AND gates 42, 44, 46 and 48 along with a control input shown comprising an LSD signal applied to a terminal 50 and its complement provided by an inverter 52. As shown, output lead $a''_1$ is coupled to one input of AND gate 42 while its other input is coupled to terminal 50 through the signal inverter 52. Output lead $b''_1$ is coupled to one input of AND gate 46 along with the $\overline{LSD}$ signal out of the inverter 52. Signal lead $a''_2$ is connected to one input of AND gate 44 whose other input is directly connected to the LSD signal terminal 50. Terminal 50 is also connected to one input of AND gate 48 whose other input is connected to circuit lead $b''_2$ from the EXCLUSIVE OR gate 40. The outputs of the AND gates 42 and 44 couple to a first NOR gate 52 which provides an output signal on circuit lead $A_1$ which comprises one of the leads of the two wire signaling path to the SPU error collector 18 shown in FIG. 1. The other output lead comprises the lead $B_1$ which is connected to the output of a second NOR gate 54 coupled to the outputs of the AND gates 46 and 48.

In operation, the four state signal circuit $20_1$ couples the combined status of the two two wire signal paths $a'_1, b'_1$ and $a'_2, b'_2$ from the BIT signal combiner $19_1$ through its logic gates to the two wire output pair $A_1, B_1$ while a "no error" condition exists. In such instance, mutually opposite binary values will appear on circuit leads $a''_1, b''_1$ from the fault combiner 36. Concurrently, the LSD signal applied to terminal 50 will typically have a binary 0 applied thereto which causes the inverter 52 to output a binary 1. It can readily be seen that under such conditions, the binary output signals on circuit leads $A_1$ and $B_1$ will be of mutually opposite values, 0 and 1 or 1 and 0, indicating a "no error" condition. However, where an "error" or failure is outputted from either register 32 or 34, the logic circuitry of the signaling circuit $20_1$ will provide the same binary values on signal leads $A_1$ and $B_1$, i.e. 1 and 1 or 0 and 0 which are fed to the system bit error collector circuitry 22 as shown in FIG. 1 which operates to clock this report termed a "primary failure report" into one or more registers, not shown. Concurrently with this report being coupled to the system bit error collector 22 over the two wire signal lines A', B', the system clock 24 is stopped and an LSD signal having a binary 1 value is now applied to terminal 50 in FIG. 2 which acts to convert the binary outputs on lines $A_1$, $B_1$ from a two state indicator into a four state indicator which is now adapted to provide in a "secondary failure report" mode details of the failure previously provided in the "primary failure report".

Due to the fact that the fault register 32 which outputs SPU internal and output signal errors only to the EXCLUSIVE OR circuit 38 while the register 34 outputs only SPU input signal errors which are coupled to the EXCLUSIVE OR circuit 40, the following truth table is thereby implemented in the four state signal circuit $20_1$.

TABLE I

| WIRE $A_1$ | WIRE $B_1$ | SPU BIT STATUS |
| --- | --- | --- |
| 0 | 0 | No error |
| 1 | 0 | Input signal related error |
| 0 | 1 | Internal SPU error |
| 1 | 1 | Both input signal and internal SPU errors |

When these four secondary reports are coupled to the module's BIT error collector 18 along with any four state built-in test status from the other signal processing units $12_2 \ldots 12_n$, the module BIT error collector circuitry 18 applies a predetermined priority selection to the collected data to provide specific module built-in test status to the system built-in test error collector 22. The highest error priority is assigned to BIT indication inconsistencies, meaning that SPUs which have not declared the presence of an error or failure but do not signal a "no error" when the four state mode of signal circuit $20_1$, for example, has declared the presence of an error. The next highest priority is assigned to error indications of the type where signal processing unit errors are not of the input signal type but are either internal failures or output signal failures. The third priority comprises a status when all error reports provided to the module built-in test circuitry 18 are all input signal faults or special errors. For all error reporting conditions which do not satisfy a higher priority, the fourth priority defines an input fault to the system built-in test error collector 22 at the wires A' and B' of FIG. 1. Such a priority selection is set forth in Table II.

TABLE II

| PROCESSING UNIT ERROR REPORT | | WIRE $A_1$, | WIRE $B_1$ | PRIORITY/TYPE OUTPUT |
|---|---|---|---|---|
| No error | } Any { | (0 | 0) | Highest-BIT signaling |
| error | | 0 | 0 | inconsistency |
| Error | Any | 0 | 1 | Second- SPU failure exclusive of input signal errors |
| Error | All | 1 | 1 | Third-input signal errors or special faults |
| Error | | — | | Fourth-None of higher priority |

This prioritization can be implemented by conventional techniques or, when desirable, can be implemented by circuitry similar to the four state signal circuitry $20_1$ shown in FIG. 2. In either case the initial conveyance of an error occurrence in a module 10 as a result of more faults or failures occurring in the signal processing units $12_1$, $12_2$ ... $12_n$ is logically provided to the system level built-in test circuitry 22 (FIG. 1) with the same two wire signaling path techniques as used within the module 10.

Subsequent to the arrival at the system built-in test error collector 22 of the prioritized module built-in test error reports from the error collector circuitry 18, further built-in test circuitry, not shown, can implement further decision making rules such as those shown in the following Table III.

TABLE III

| SYSTEM ERROR STATUS | ACTION |
|---|---|
| Only error report is from a single SPU | INDICT REPORTING MODULE |
| Module report is not an input sig. report | INDICT THAT MODULE |
| All reports are input reports | NO CLEAR INDICTMENT |

Further fault analysis, either using more capable built-in test system circuitry or via added diagnostic equipment is aided by providing system level access to all processing unit fault report detailed. Using registers per processing unit within each module built-in test circuit allows the data collected within each module to be serially provided to the system built-in test circuitry and/or added diagnostic equipment. Full serial flow can be obtained by daisy-chaining all module built-in test register circuits or serial-parallel flow can be supported over the already existing error reporting paths between each module and the system built-in test circuitry.

Having thus shown and described what is at present considered to be the preferred embodiments of the invention, it is to be noted that all modifications, variations and changes coming within the spirit and scope of the invention are herein meant to be included.

We claim:

1. A method of signaling failures and their causality by built-in test apparatus for a digital type electrical system including at least one signal processing unit subject to different types of failures, comprising the steps of:

signaling operational status of said signal processing unit to first level status collector means by way of a plurality of two wire digital signaling paths, each of which respectively provides an initial two state status report of failure or no failure of a different one of said types of failure to said first level status collector means; and converting said two wire digital signaling paths, upon the signaling of a failure, into two wire digital signaling paths providing to said first level status collector means respective secondary plural state status reports conveying information as to the type and therefore the cause of failure initially reported.

2. The method as defined by claim 1 wherein said secondary plural state status comprises a number of states greater than two.

3. The method as defined by claim 1 wherein said secondary plural state status comprises a four state status.

4. The method as defined by claim 1 and additionally including the step of signaling, on a priority basis, the cause of failure reported by said secondary status report to second level status collector means following the report thereto of said initial reports, said second level status collector means providing information effective in improving system operational diagnosis.

5. The method as defined by claim 4 wherein said system is comprised of a plurality of signal processing units and said signaling step comprises signaling the operational status of selected ones of said signaling processing units to said first level status collector means, said first level status collector means further conveying to said second level status collector means not only the failure priority report for each of said selected ones of signal processing units, but also the number of such reports.

6. The method as defined by claim 5 wherein said signaling step comprises signaling the operational status of all said signal processing units and wherein said converting step comprises converting said two state status report into a four state status report.

7. The method as defined by claim 6 wherein said signaling step includes conveying input signal failures of said signal processing units to said first level status collector means in a first set of digital signals and conveying internal failures and output signal failures of said signal processing unit to said first level status collector means in a second set of digital signals.

8. The method as defined by claim 7 wherein said last recited step of conveying includes the further step of signal multiplexing the respective digital signal of said first and second set of digital signals to said second level status collector means.

9. The method as defined by claim 8 wherein said converting step further includes the step of logically gating the multiplexed first and second set of digital signals in a predetermined format to said second level status collector means and thereby providing said secondary four state status report.

10. The method as defined by claim 9 wherein said four state status report comprises:
   a no failure report in a first state, an input signal failure report in a second state, an internal failure or output signal failure report in a third state and both input and output signal and internal failure report in a fourth state.

11. Apparatus for signaling on-line failures and their causality in a digital type electrical system comprising;
   at least one signal processing unit in said electrical system and having internal built-in test apparatus operable to detect selected types of failures related to the operation of said signal processing unit;
   first level status collector means;
   a plurality of two wire digital signaling paths coupled between said signal processing unit and said first level status collector means for signaling the operational status of said signal processing unit, each of said paths providing an initial two state status report of a failure or no failure of a different one of said selected types of failure of said signal processing unit to said first level status collector means; and
   circuit means coupled between said signal processing unit and said first level status collector means for converting said two wire digital signaling paths, upon the signaling of a failure, into two wire digital signaling paths providing to said first level status collector means respective secondary plural state status reports conveying information as to the type and therefore the cause of failure initially reported by said two state status report.

12. The apparatus as defined by claim 11 wherein said plural state status reports comprise a number of states greater than two.

13. The apparatus as defined by claim 11 wherein said plural state status reports comprise a four state status report.

14. The apparatus as defined by claim 11 and additionally including second level status collector means coupled to said first level status collector means, and wherein said first level status collector means is operable on a priority basis to signal to said second level status collector the cause of failure reported by said secondary status reports following said initial status report, said second level status collector means in turn being operable to provide further information to said electrical system indicative of the operational state of said signal processing unit.

15. The apparatus as defined by claim 14 wherein said electrical system includes a plurality of said signal processing units coupled to said first level status collector means by respective pluralities of two wire digital signaling paths and converting means, said first level status collector means conveying to said second level status collector means not only the failure priority report of each of said plurality of signal processing units, but also the number of such reports.

16. The apparatus as defined by claim 15 wherein each said converting means coupled between said plurality of signal processing units and said first level status collector means comprises means for converting said two state status report into a four state status report.

17. The apparatus as defined by claim 16 wherein each said plurality of two wire signaling paths comprises two sets of signaling paths, and wherein the first set thereof conveys input signal failures to said first level status collector means and wherein the second set thereof conveys internal failures and output signal failures to said first level status collector means.

18. The apparatus as defined by claim 17 wherein said converting means includes first and second signal combiner means respectively coupled to said first and second set of two wire signaling paths to provide respective first and second two wire signaling paths therefrom, and wherein said converter means includes third signal combiner means and logic gating means coupled to said first and second pairs of two wire signaling paths and being responsive to a control signal generated when said initial two state status report indicates a failure report to format the digital signals on said first and second two wire signaling paths into a four state status report signal coupled to said second level status collector means.

19. The apparatus as defined by claim 18 wherein the output of said third signal combiner is coupled to a two wire output signal path and said logic gating means is comprised of two EXCLUSIVE OR gates coupled to four AND gates and two NOR gates, and additionally including a single wire output signal path from each EXCLUSIVE OR gate, wherein said two wire output signal paths are respectively coupled to respective first inputs of a first and second AND gate of said four AND gates, said control signal being coupled to a second input of said first and second AND gates by means of a signal inverter, said single output signal paths of said EXCLUSIVE OR gates respectively coupled to first inputs of a third and fourth AND gate of said four AND gates, said second input of said third and fourth AND gate being directly coupled to said control signal, wherein the output of said first and third AND gate are respectively coupled to first and second inputs of a first NOR gate of said two NOR gates, the output of said second and fourth AND gates are respectively coupled to first and second inputs of a second NOR gate of said first and second NOR gates, and wherein said first and second NOR gates couple to a respective single wire signaling path of a two wire signaling path to said first level status collector means.

* * * * *